US012257850B2

(12) United States Patent
Hozumi et al.

(10) Patent No.: US 12,257,850 B2
(45) Date of Patent: Mar. 25, 2025

(54) CIRCULATION DEVICE

(71) Applicant: KYOCERA CORPORATION, Kyoto (JP)

(72) Inventors: Daisuke Hozumi, Kirishima (JP); Hiroyuki Sugimoto, Kirishima (JP)

(73) Assignee: KYOCERA CORPORATION, Kyoto (JP)

( * ) Notice: Subject to any disclaimer, the term of this patent is extended or adjusted under 35 U.S.C. 154(b) by 428 days.

(21) Appl. No.: 17/638,776

(22) PCT Filed: Aug. 28, 2020

(86) PCT No.: PCT/JP2020/032777
§ 371 (c)(1),
(2) Date: Feb. 25, 2022

(87) PCT Pub. No.: WO2021/040034
PCT Pub. Date: Mar. 4, 2021

(65) Prior Publication Data

US 2022/0274419 A1 Sep. 1, 2022

(30) Foreign Application Priority Data

Aug. 30, 2019 (JP) ................................ 2019-159116

(51) Int. Cl.
*B41J 2/175* (2006.01)
*B41J 2/18* (2006.01)

(52) U.S. Cl.
CPC ............. *B41J 2/17596* (2013.01); *B41J 2/18* (2013.01)

(58) Field of Classification Search
CPC . B41J 2/18; B41J 2/17596; B41J 29/38; B41J 3/4073; B41J 2/17593; B05B 13/0431; B05B 15/58; B05C 5/0216
See application file for complete search history.

(56) References Cited

U.S. PATENT DOCUMENTS 6,179,406 B1 * 1/2001 Ito ........................ B41J 2/17596 347/35
8,403,439 B2 * 3/2013 Tanaka ..................... B41J 29/38 347/17
(Continued)

FOREIGN PATENT DOCUMENTS

CN 102848733 A 1/2013
JP H11-165406 A 6/1999
(Continued)

*Primary Examiner* — An H Do
(74) *Attorney, Agent, or Firm* — HAUPTMAN HAM, LLP

(57) ABSTRACT

A circulation device according to an aspect includes a storage unit for storing liquid and a liquid droplet discharge unit for discharging liquid, and controls circulation of liquid flowing through a channel communicating the storage unit and the liquid droplet discharge unit with each other. Such a circulation device includes a robotic portion, a first pressure portion, a second pressure portion, a first valve portion, and a second valve portion. The robotic portion is mounted with the liquid droplet discharge unit. The first pressure portion feeds the liquid stored in the storage unit to the liquid droplet discharge unit through a first channel communicating the storage unit and the liquid droplet discharge unit with each other. The second pressure portion feeds the liquid recovered in the liquid droplet discharge unit to the storage unit through a second channel communicating the storage unit and the liquid droplet discharge unit with each other. The first valve portion is interposed between the first pressure portion and the liquid droplet discharge unit. The second valve portion is interposed between the second pressure portion and the liquid droplet discharge unit.

12 Claims, 7 Drawing Sheets

(56) References Cited

U.S. PATENT DOCUMENTS

| | | | | |
|---|---|---|---|---|
| 8,794,747 | B2 * | 8/2014 | Enomoto | B41J 2/17596 347/85 |
| 9,616,446 | B2 | 4/2017 | Hirota et al. | |
| 10,427,414 | B2 * | 10/2019 | McAuliffe | B41J 2/17596 |
| 2009/0167817 | A1 | 7/2009 | Orr | |
| 2010/0253742 | A1 | 10/2010 | Essen | |
| 2013/0002772 | A1 | 1/2013 | Hiratsuka et al. | |
| 2017/0106397 | A1 | 4/2017 | Akaishi et al. | |

FOREIGN PATENT DOCUMENTS

| | | | |
|---|---|---|---|
| JP | 2006-159811 | A | 6/2006 |
| JP | 2007-163609 | A | 6/2007 |
| JP | 4235631 | B2 | 3/2009 |
| JP | 2009226313 | A | 10/2009 |
| JP | 2011-020435 | A | 2/2011 |
| JP | 201310219 | A | 1/2013 |
| JP | 2015-036127 | A | 2/2015 |
| JP | 2015167934 | A | 9/2015 |
| JP | 2015188794 | A | 11/2015 |
| JP | 2017-047413 | A | 3/2017 |
| JP | 2018149482 | A | 9/2018 |

* cited by examiner

| CONTROL TARGET | TARGET VALUE |
| --- | --- |
| FIRST PROPORTIONAL VALVE | MV1 |
| SECOND PROPORTIONAL VALVE | MV2 |

CIRCULATION DEVICE

CROSS-REFERENCE TO RELATED APPLICATION(S)

This application is a national stage application of International Application No. PCT/JP2020/032777, filed on Aug. 28, 2020, which claims priority to Japanese Patent Application No. 2019-159116, filed on Aug. 30, 2019.

TECHNICAL FIELD

The disclosed embodiments relate to a circulation device.

BACKGROUND ART

Inkjet printers and inkjet plotters that utilize an inkjet recording method are known as printing apparatuses. A liquid discharge head for discharging liquid is mounted in printing apparatuses using such an inkjet method.

In addition, in a device that discharges liquid, such as an inkjet printing apparatus, a technique for controlling discharge of liquid, a technique for preventing waste of liquid being discharged, a technique for efficiently replacing liquid, and the like have been proposed.

CITATION LIST

Patent Literature

Patent Document 1: JP 2009-226313 A
Patent Document 2: JP 2015-167934 A
Patent Document 3: JP 4235631 B

SUMMARY OF INVENTION

A circulation device according to an aspect of an embodiment includes a storage unit that stores liquid and a liquid droplet discharge unit that discharges liquid, and controls circulation of liquid fed from the storage unit to the liquid droplet discharge unit. Such a circulation device includes a robotic portion, a first pressure portion, a second pressure portion, a first valve portion, and a second valve portion. The robotic portion is mounted with the liquid droplet discharge unit. The first pressure portion feeds the liquid stored in the storage unit to the liquid droplet discharge unit through a first channel communicating the storage unit and the liquid droplet discharge unit with each other. The second pressure portion feeds the liquid recovered in the liquid droplet discharge unit to the storage unit through a second channel communicating the storage unit and the liquid droplet discharge unit with each other. The first valve portion is interposed between the first pressure portion and the liquid droplet discharge unit. The second valve portion is interposed between the second pressure portion and the liquid droplet discharge unit.

DESCRIPTION OF EMBODIMENTS

Embodiments of a circulation device disclosed in the present application will be described in detail below with reference to the accompanying drawings. Note that the invention according to the present application is not limited to the embodiments that will be described below.

The circulation device disclosed in the present application can be applied to inkjet printers and inkjet plotters that each utilize an inkjet recording method as well as devices that each discharge liquid droplets in an inkjet method.

Configuration Example of Circulation Device

Figure 1:
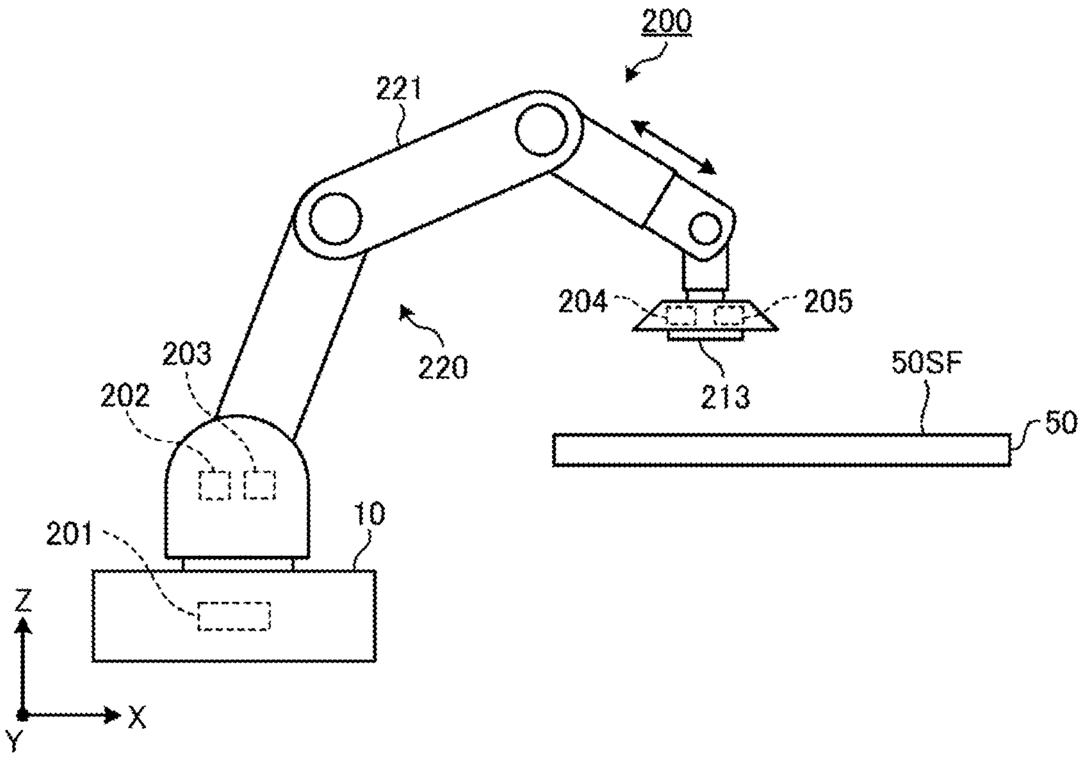
FIG. 1 is a diagram schematically illustrating a configuration example of a circulation device according to an embodiment.
Figure 2:
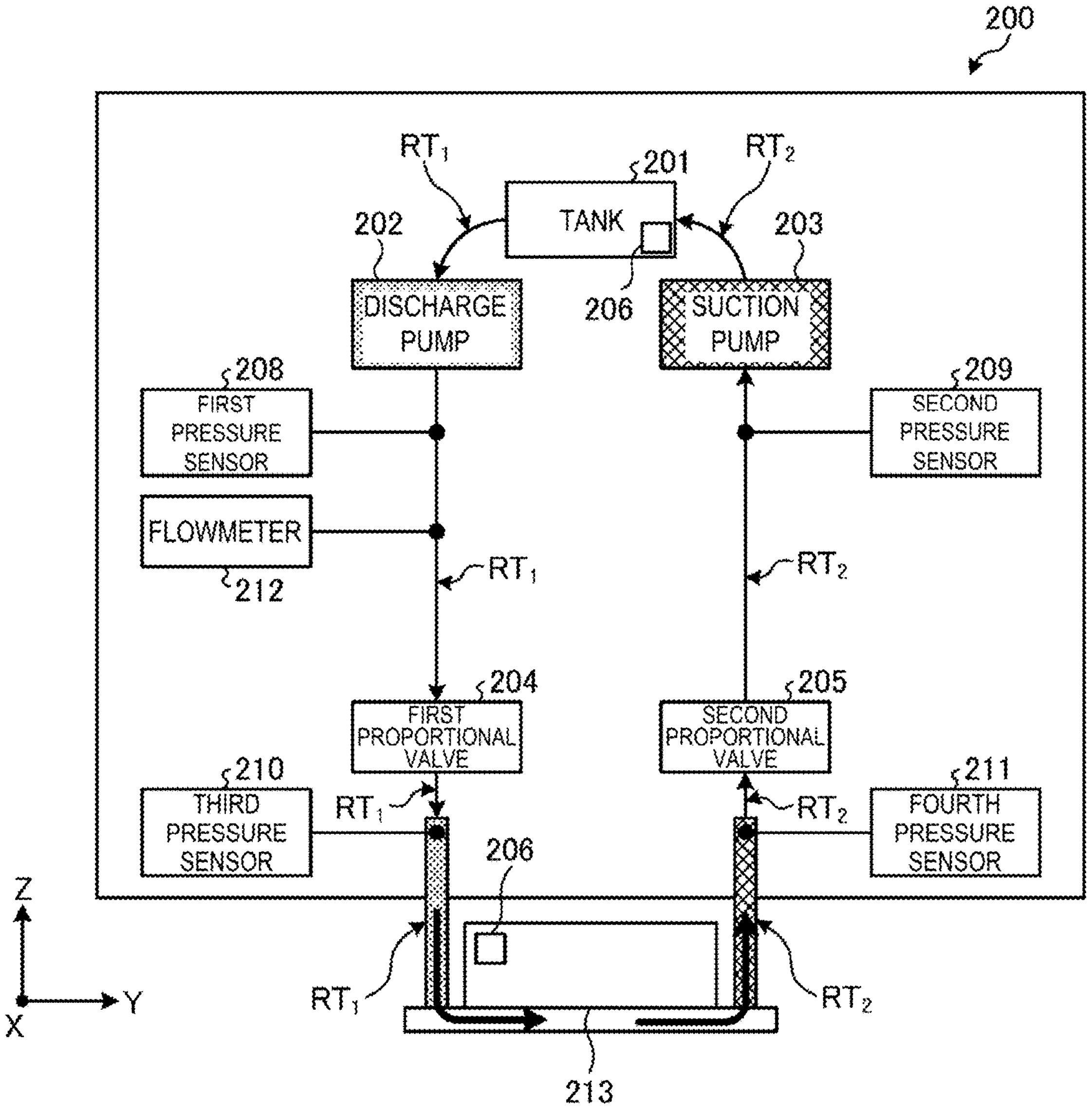
FIG. 2 is a diagram schematically illustrating a configuration example of a circulation mechanism of a circulation device according to an embodiment.

A configuration of a circulation device according to an embodiment will be described using FIGS. 1 and 2. FIG. 1 is a diagram schematically illustrating a configuration example of a circulation device according to an embodiment. FIG. 2 is a diagram schematically illustrating a configuration example of a circulation mechanism of a circulation device according to an embodiment.

As illustrated in FIG. 1 or 2, a circulation device 200 includes a base 10, a tank 201, a discharge pump 202, a suction pump 203, a first proportional valve 204, a second proportional valve 205, and a heater 206. As illustrated in FIG. 1 or 2, the circulation device 200 also includes a first pressure sensor 208, a second pressure sensor 209, a third pressure sensor 210, a fourth pressure sensor 211, a liquid droplet discharge head 213, and a robotic portion 220. As illustrated in FIG. 2, the circulation device 200 having such a configuration controls circulation of the liquid fed from the tank 201 to the liquid droplet discharge head 213.

The base 10 is placed, for example, on a horizontal floor surface indoors or outdoors. The base 10 is provided with the tank 201 that stores liquid. This can prevent rocking of the surface of the liquid stored in the tank 201.

The robotic portion 220 assembled on the base 10 includes an arm portion 221. The arm portion 221 is formed of a plurality of parts that are bent and stretched, and rotatably assembled. In accordance with a predetermined command, the arm portion 221 can, for example, move the liquid droplet discharge head 213 mounted on a tip of the arm portion 221 and change the position, posture, and angle of the liquid droplet discharge head 213. The arm portion 221 illustrated in FIG. 1 is not particularly limited to the configuration illustrated in FIG. 1 as long as the arm portion 221 is provided with a degree of freedom with which the liquid droplet discharge head 213 can change the movement, position, posture, angle, and the like as necessary.

The discharge pump 202 and the suction pump 203 are provided on a root side of the arm portion 221 including the robotic portion 220 assembled on the base 10. In the circulation device 200, pulsation is likely to be caused by the discharge pump 202 and the suction pump 203. The circulation device 200 according to an embodiment includes the first proportional valve 204 and the second proportional valve 205, which are described below, and thereby absorbs the pulsation by the discharge pump 202 and the suction pump 203.

The first proportional valve 204, as illustrated in FIG. 2, is interposed in a first channel $RT_1$ between the discharge pump 202 and the liquid droplet discharge head 213, and as illustrated in FIG. 1, is provided on a tip side of the arm portion 221 including the liquid droplet discharge head 213 assembled on the robotic portion 220. The second proportional valve 205, as illustrated in FIG. 2, is interposed in a second channel $RT_2$ between the suction pump 203 and the liquid droplet discharge head 213, and as illustrated in FIG. 1, is provided on the tip side of the arm portion 221 including the liquid droplet discharge head 213 assembled on the robotic portion 220. The first proportional valve 204 and the second proportional valve 205 can be mounted on the arm portion 221 by being disposed in a frame member (not illustrated) provided at the tip of the arm portion 221. This strengthens the fixing of the first proportional valve 204 and the second proportional valve 205.

Additionally, the first proportional valve 204 and the second proportional valve 205 are mounted on the tip side of the arm portion 221 including the liquid droplet discharge head 213 assembled thereupon, thereby providing a degree of distance between the discharge pump 202 and the suction pump 203, and the liquid droplet discharge head 213. Thus, the circulation device 200 is less likely to transmit pulsation by the discharge pump 202 and the suction pump 203 to the liquid droplet discharge head 213. Furthermore, the circulation device 200 can suppress as much as possible the pulsation that reaches the liquid droplet discharge head 213 by the first proportional valve 204 and the second proportional valve 205.

The heater 206 is provided, for example, inside the tank 201 and inside the liquid droplet discharge head 213. Note that the heater 206 may be provided adjacent to the tank 201 instead of inside the tank 201 as long as the heat of the heater 206 is transmitted to the tank 201. Likewise, the heater 206 may be provided adjacent to the liquid droplet discharge head 213 instead of inside the liquid droplet discharge head 213 as long as the heat of the heater 206 is transmitted to the liquid droplet discharge head 213. Furthermore, the heater 206 may be provided in either one of the tank 201 and the liquid droplet discharge head 213.

Modified Example

Figure 3:
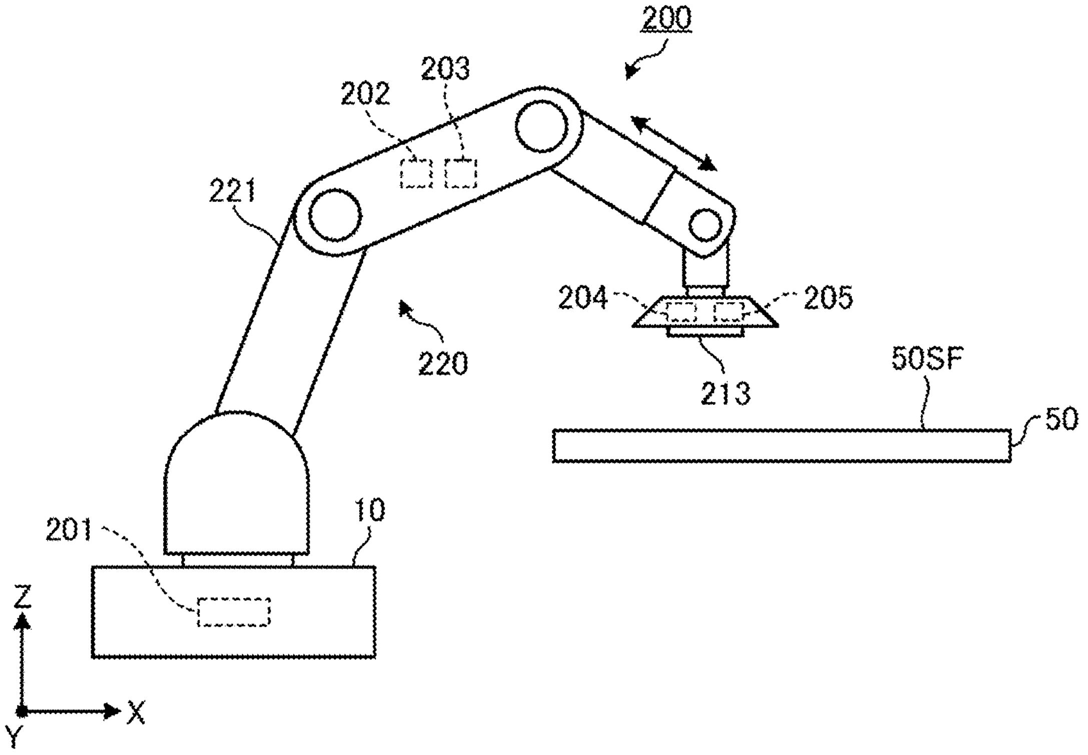
FIG. 3 is a diagram schematically illustrating a configuration example of a circulation device according to a modified example.

FIG. 1 illustrates an example in which the discharge pump 202 and the suction pump 203 are mounted on the root side of the arm portion 221 including the robotic portion 220 assembled on the base 10, but the configuration may not be particularly limited to this example. A modified example of the mounting positions of the discharge pump 202 and the suction pump 203 will be described using FIG. 3. FIG. 3 is a diagram schematically illustrating a configuration example of a circulation device according to a modified example.

For example, as illustrated in FIG. 3, the circulation device 200 may be provided with the discharge pump 202 and the suction pump 203 at an intermediate position in the vicinity of a midpoint between the tip of the arm portion 221 and the root thereof. As illustrated in FIG. 3, the discharge pump 202 and the suction pump 203 may be provided at an intermediate position of the arm portion 221, thereby increasing the output efficiency of the pumps compared to a case, as illustrated in FIG. 1, where the pumps are provided on the root side of the arm portion 221. Note that at least one of the discharge pump 202 and the suction pump 203 may be provided at an intermediate position in the vicinity of a midpoint between the tip of the arm portion 221 and the root thereof.

Figure 4:
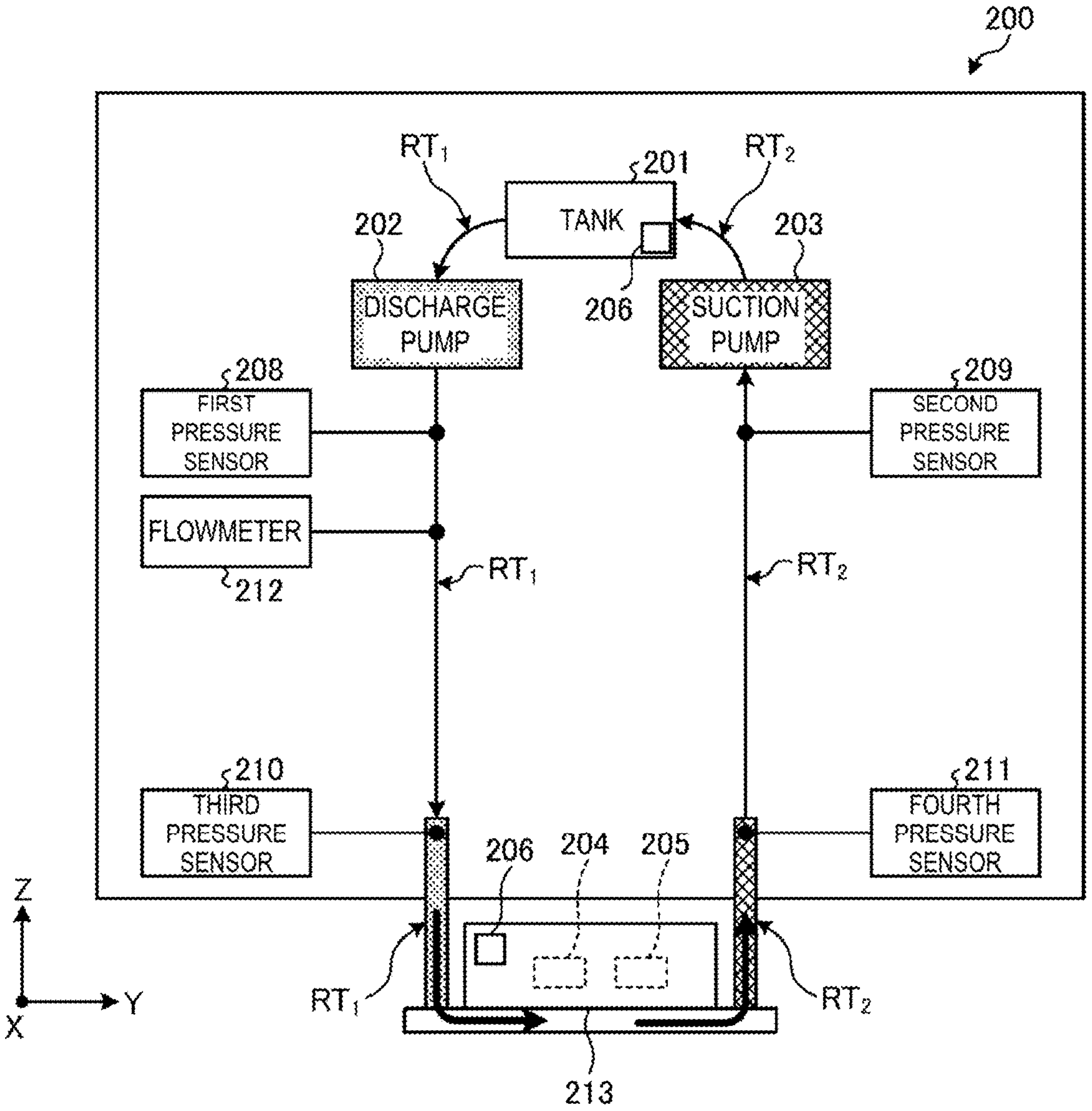
FIG. 4 is a diagram schematically illustrating a configuration example of a circulation mechanism of a circulation device according to a modified example.

FIG. 2 explains an example in which the first proportional valve 204 is interposed in the first channel $RT_1$ between discharge pump 202 and the liquid droplet discharge head 213 and the second proportional valve 205 is interposed in the second channel $RT_2$ between the suction pump 203 and the liquid droplet discharge head 213. However, the configuration may not be particularly limited to this example. A modified example of the mounting positions of the first proportional valve 204 and the second proportional valve 205 will be described below using FIG. 4. FIG. 4 is a diagram schematically illustrating a configuration example of a circulation mechanism of a circulation device according to a modified example.

As illustrated in FIG. 4, the first proportional valve 204 and the second proportional valve 205 may be housed inside the liquid droplet discharge head 213. As illustrated in FIG. 4, the first proportional valve 204 and the second proportional valve 205 may be closer to the liquid droplet discharge head 213 than in the example illustrated in FIG. 2, thereby improving response to pulsation by the pumps. Note that at least one of the first proportional valve 204 and the second proportional valve 205 may be housed inside the liquid droplet discharge head 213.

Additionally, the first proportional valve 204 and the second proportional valve 205 are each preferably provided, as illustrated in FIG. 1, on the tip side of the arm portion 221, but as long as the first proportional valve 204 and the second proportional valve 205 are interposed in the first channel $RT_1$ and the second channel $RT_2$, respectively, an effect of suppressing the transmission of the pulsation to the liquid droplet discharge head 213 can be expected. Note that at least one of the first proportional valve 204 and the second proportional valve 205 may be provided on the tip side of the arm portion 221.

Furthermore, the circulation device 200 may include a single pump that integrates the discharge pump 202 and the suction pump 203 as a mechanism for circulating liquid. Also, a proportional valve for controlling the flow rate of the liquid is disposed on a discharge side of the liquid between the discharge pump 202 and the liquid droplet discharge head 213. Alternatively, a proportional valve for controlling the flow rate of the liquid is disposed on a recovery side of the liquid between the discharge pump 202 and the liquid droplet discharge head 213. Thus, even in a configuration including the pump that integrates the discharge pump 202 and the suction pump 203, the pulsation caused by the pump is less likely to be transferred to the liquid droplet discharge head 213.

Also, the tank 201 and the liquid droplet discharge head 213 may be configured to be heat-resistant. Such a configuration is less susceptible to fluctuations in the outside temperature, and the thermal efficiency of the heater 206 can be expected to improve.

Example of Functional Configuration

Figure 5:
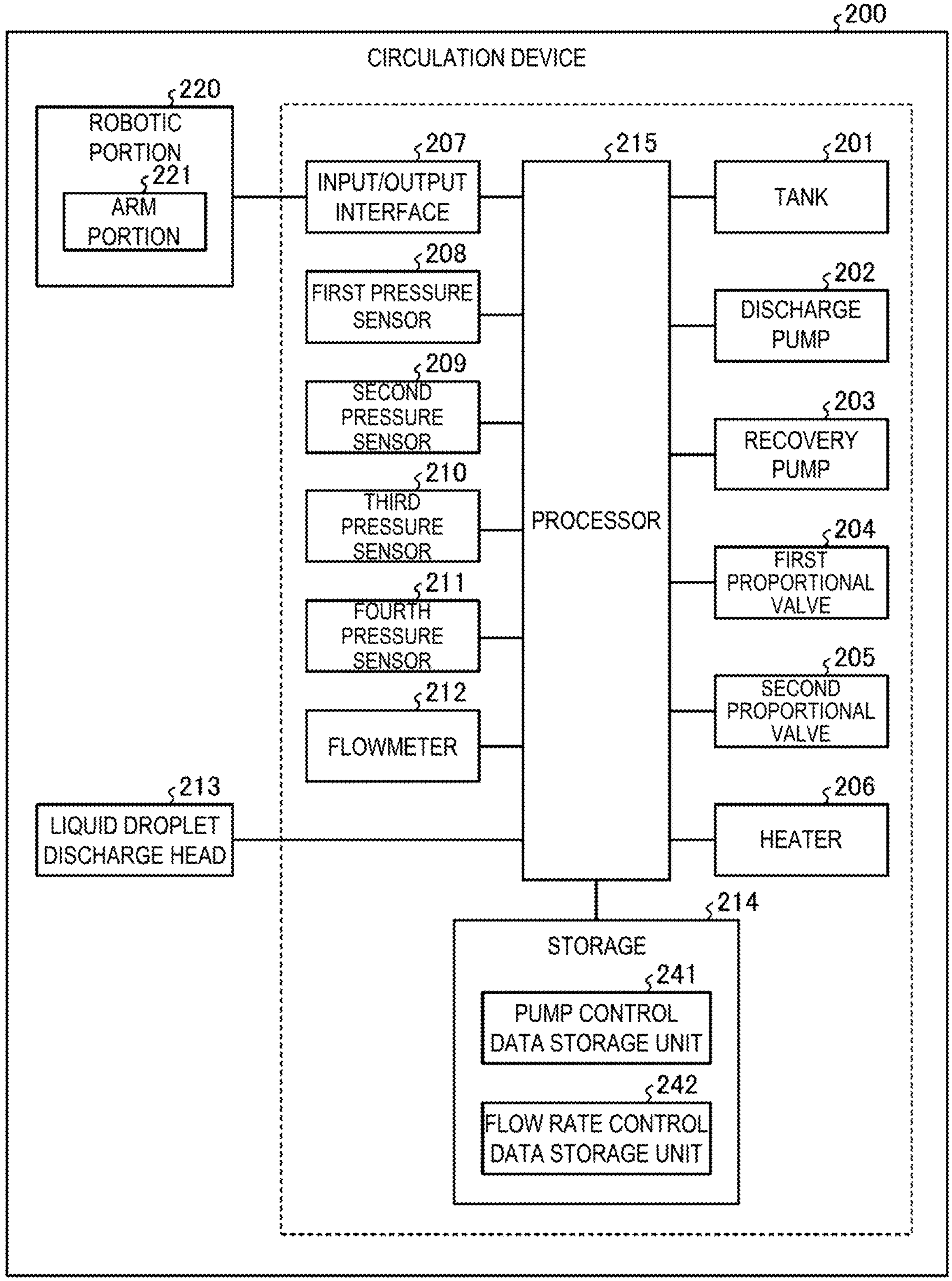
FIG. 5 is a diagram illustrating an example of a functional configuration of a circulation device according to an embodiment.

An example of a functional configuration of the circulation device 200 according to an embodiment will be described using FIG. 5. FIG. 5 is a diagram illustrating an example of a functional configuration of a circulation device according to an embodiment.

Note that FIG. 5 illustrates an example of a functional configuration of the circulation device 200 according to an embodiment, and the functional configuration of the circulation device 200 should not be particularly limited to the example illustrated in FIG. 5, provided that the functions of the circulation device 200 according to the embodiment can be realized. In addition, FIG. 5 illustrates, in functional blocks, components provided in the circulation device 200 according to the embodiment and omits a description of other components in general. Moreover, the components of the circulation device 200 illustrated in FIG. 5 are functional concepts and are not limited to the example illustrated in FIG. 5, and are not necessarily physically configured as illustrated. For example, the specific form of distribution and integration of each of the functional blocks is not limited to that illustrated, and all or a portion thereof can be functionally or physically distributed and integrated in any unit, depending on various loads, usage conditions, and the like.

As illustrated in FIG. 5, the circulation device 200 includes a tank 201, a discharge pump 202, a suction pump 203, a first proportional valve 204, a second proportional valve 205, and a heater 206. The circulation device 200 also includes an input/output interface 207, the first pressure sensor 208, the second pressure sensor 209, the third pressure sensor 210, the fourth pressure sensor 211, a flowmeter 212, and the liquid droplet discharge head 213. The circulation device 200 further includes a storage 214, a processor 215, and the robotic portion 220.

The circulation device 200 illustrated in FIG. 5 includes the first channel $RT_1$ and the second channel $RT_2$ (see FIG. 2). The first channel $RT_1$ is a channel that allows the liquid stored in the tank 201 to flow into the liquid droplet discharge head 213. The second channel $RT_2$ is a channel communicating the tank 201 and the liquid droplet discharge head 213 with each other to allow the liquid that has flowed into the liquid droplet discharge head 213 to return to the tank 201. The liquid recovered in the liquid droplet discharge head 213 without being discharged from the liquid droplet discharge head 213 to the outside is sent back through the second channel $RT_2$ to the tank 201. The first channel $RT_1$ and the second channel $RT_2$ can be implemented, for example, by a pipe formed of a predetermined material that does not interact with constituents of the liquid. The circulation device 200 having such components controls the circulation of the liquid fed from the tank 201 to the liquid droplet discharge head 213.

The tank 201 stores the liquid supplied to the liquid droplet discharge head 213. The tank 201 functions as a storage unit for storing the liquid supplied to the liquid droplet discharge head 213.

The discharge pump 202 functions as a first pressure portion that feeds the liquid stored in the tank 201 to the liquid droplet discharge head 213 through the first channel $RT_1$. The discharge pump 202 generates positive pressure for feeding the liquid stored in the tank 201 to the liquid droplet discharge head 213. The discharge pump 202 feeds the liquid from the tank 201 to the liquid droplet discharge head 213 at a predetermined constant pressure.

The suction pump 203 functions as a second pressure portion that feeds the liquid recovered in the liquid droplet discharge head 213 to the tank 201 through the second channel $RT_2$. The suction pump 203 generates negative pressure for sucking the liquid from the liquid droplet discharge head 213 and sending the liquid back to the tank 201. The suction pump 203 sends the liquid back to the tank 201 from the liquid droplet discharge head 213 at a predetermined constant pressure.

The discharge pump 202 and the suction pump 203 can be implemented by a rotary pump such as a gear pump or a positive displacement pump such as a diaphragm pump.

The first proportional valve 204 functions as a first valve portion interposed in the first channel $RT_1$ between the tank 201 and the liquid droplet discharge head 213. The first proportional valve 204 proportionally controls the flow rate of the liquid fed from the tank 201 to the liquid droplet discharge head 213. The first proportional valve 204 can continuously modify the channel cross-sectional area for the liquid between 0 to 100%, and controls the flow rate of the liquid to a desired flow rate. For example, the first proportional valve 204 can reduce the channel cross-sectional area of the liquid and thereby suppress the pulsation generated in the liquid by the discharge pump 202.

The second proportional valve 205 functions as a second valve portion interposed in the second channel $RT_2$ between the tank 201 and the liquid droplet discharge head 213. The second proportional valve 205 proportionally controls the flow rate of the liquid fed from the liquid droplet discharge head 213 to the tank 201. The second proportional valve 205 can continuously modify the channel cross-sectional area for the liquid between 0 to 100%, and controls the flow rate of the liquid to a desired flow rate. For example, the second proportional valve 205 can reduce the channel cross-sectional area of the liquid and thereby reduce the pulsation generated in the liquid by the suction pump 203.

The first proportional valve 204 and the second proportional valve 205 can be implemented by a proportional selector valve of an electromagnetic type or a proportional selector valve of a pneumatic type.

The heater 206 heats the liquid stored in the tank 201 and the liquid circulating through the liquid droplet discharge head 213.

The input/output interface 207 exchanges various types of information with the robotic portion 220. The input/output interface 207 can transmit a control signal for causing the robotic portion 220 to perform a predetermined operation.

The first pressure sensor 208 measures, by the discharge pump 202, the fluid pressure of the liquid fed from the tank 201 to the liquid droplet discharge head 213. The first pressure sensor 208 measures the pressure downstream of the discharge pump 202 in a circulation direction of the liquid in the circulation device 200. The first pressure sensor 208 sends the measurement results to the processor 215.

The second pressure sensor 209 measures the fluid pressure of the liquid that is sucked from the liquid droplet discharge head 213 by the suction pump 203 and fed to the tank 201. The second pressure sensor 209 measures the pressure upstream of the suction pump 203 in the circulation direction of the liquid in the circulation device 200. The second pressure sensor 209 sends the measurement results to the processor 215.

The third pressure sensor 210 measures, through the first channel $RT_1$, the fluid pressure of the liquid flowing between the first proportional valve 204 and the liquid droplet discharge head 213. The third pressure sensor 210 measures the fluid pressure of the liquid immediately before the liquid flows into the liquid droplet discharge head 213 after passing through the first proportional valve 204. That is, the third pressure sensor 210 measures the fluid pressure downstream of the first proportional valve 204 in the circulation direction of the liquid in the circulation device 200. The third pressure sensor 210 sends the measurement results to the processor 215.

The fourth pressure sensor 211 measures, through the second channel $RT_2$, the fluid pressure of the liquid flowing between the second proportional valve 205 and the liquid droplet discharge head 213. The fourth pressure sensor 211 measures the fluid pressure of the liquid immediately after being fed from the liquid droplet discharge head 213 toward the tank 201 and before passing through the second proportional valve 205. That is, the fourth pressure sensor 211 measures the pressure upstream of the second proportional valve 205 in the circulation direction of the liquid in the circulation device 200. The fourth pressure sensor 211 sends the measurement results to the processor 215.

The flowmeter 212 measures the flow rate of the liquid fed to the liquid droplet discharge head 213. The flowmeter 212 sends the measurement results to the processor 215.

The liquid droplet discharge head 213 discharges the liquid fed from the tank 201 toward the object 50 illustrated in FIG. 1. The liquid droplet discharge head 213 recovers the liquid that is not discharged and feeds the liquid thus recovered to the tank 201.

The storage 214 stores programs and data necessary for various processes of the circulation device 200. The storage 214 includes, for example, a robot control data storage unit 241, a pump control data storage unit 242, and a flow rate control data storage unit 243.

The robot control data storage unit 241 stores control programs, data, and the like for controlling the operation of the arm portion 221 included in the robotic portion 220. The data stored in the robot control data storage unit 241 stores, for example, data such as an operation procedure for the liquid droplet discharge head 213 and a movement direction, position, posture, and angle during the operation thereof (liquid discharge).

The pump control data storage unit 242 stores data, set in advance, for pump control. The data for pump control includes, for example, a set value of pressure (positive pressure) applied to the liquid that the discharge pump 202 feeds, a set value of pressure (negative pressure) applied to the liquid that the suction pump 203 sucks, and the like. When considering the discharge of liquid from the liquid droplet discharge head 213, the positive pressure of the discharge pump 202 is preset to, for example, a value approximately 1.2 to 3 times higher than the pressure at which the liquid is supplied to the liquid droplet discharge head 213. In contrast, the negative pressure of the suction pump 203 is preset to a value approximately 1.2 to 3 times lower than the pressure at which the liquid is supplied to the liquid droplet discharge head 213.

Figures 6, 7:
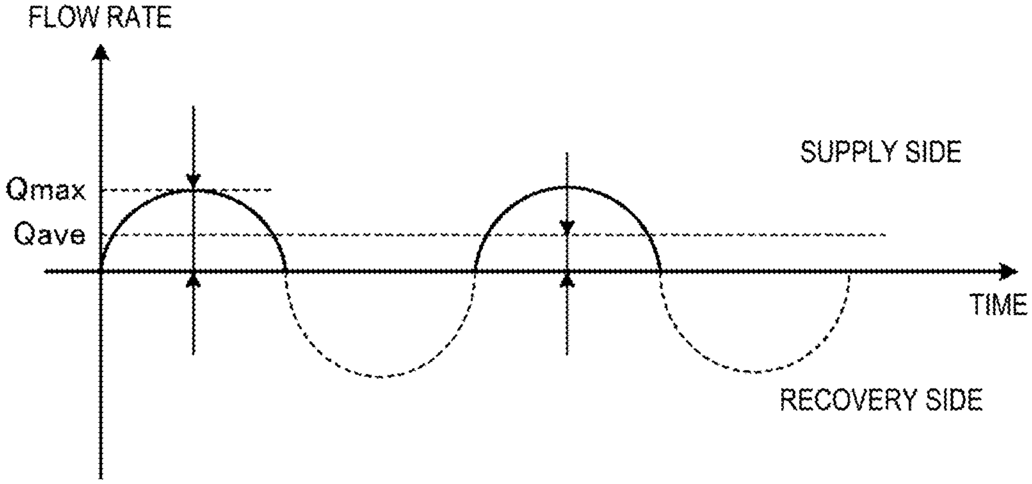
FIG. 6 is a diagram illustrating an overview of flow rate control data according to an embodiment.
FIG. 7 is a diagram schematically illustrating an example of a relationship between a flow rate of a liquid and time according to an embodiment.

The flow rate control data storage unit 243 stores flow rate control data for controlling the flow rate of the liquid circulating between the tank 201 and the liquid droplet discharge head 213. FIG. 6 is a diagram illustrating an overview of flow rate control data according to an embodiment.

As illustrated in FIG. 6, the flow rate control data stored in the flow rate control data storage unit 243 includes an item of a control target and an item of a target value, and these items are associated with each other. In the item of a control target, either the first proportional valve 204 or the second proportional valve 205, which is a control target, is registered. A target value in controlling the flow rate of the liquid is registered as the target value. Note that the target value corresponding to each of the first proportional valve 204 and the second proportional valve 205 may be the same or different. For example, a target value of an average flow rate in a certain time period may be set for each of the first proportional valve 204 and the second proportional valve 205. Further, for example, a target value of 50% of the maximum flow rate may be set with respect to the first proportional valve 204, and a target value of an average flow rate in a certain time period may be set with respect to a target value of the second proportional valve 205.

The processor 215 executes various processes in the circulation device 200 in accordance with programs, data, and the like that are stored in the storage 214. The processor 215 implements various functions for controlling the components of the circulation device 200 by reading out and executing the computer program stored in the storage 214.

Control of Robot

The processor 215 controls the operation of the arm portion 221 included in the robotic portion 220 in accordance with control programs, data, or the like that are stored in the robot control data storage unit 241. The processor 215 causes the arm portion 221 to execute a desired operation by outputting a command to control the operation of the arm portion 221 to an actuator or the like that drives the arm portion 221.

Control of Pump

The processor 215 makes an adjustment to keep constant the positive pressure applied to the liquid that the discharge pump 202 feeds in accordance with the measurement results of the first pressure sensor 208 and the measurement results of the third pressure sensor 210. For example, the processor 215 adjusts the positive pressure of the discharge pump 202 such that the pressure of the liquid obtained from the measurement results of the first pressure sensor 208 remains approximately 1.2 to 3 times larger than the pressure of the liquid obtained from the measurement results of the measurement results of the third pressure sensor 210.

The processor 215 also makes an adjustment to keep constant the negative pressure applied to the liquid that the suction pump 203 sucks in accordance with the measurement results of the second pressure sensor 209 and the third pressure sensor 210. For example, the processor 215 adjusts the negative pressure of the suction pump 203 such that the pressure of the liquid obtained from the measurement results of the second pressure sensor 209 remains approximately 1.2 to 3 times lower than the pressure of the liquid obtained from the measurement results of the measurement results of the third pressure sensor 210.

The processor 215 circulates the liquid between the tank 201 and the liquid droplet discharge head 213 by adjusting and keeping constant the differential pressure between the positive pressure that the discharge pump 202 applies to the liquid and the negative pressure that the suction pump 203 applies to the liquid.

Control of Proportional Valve

The processor 215 controls the flow rate of the liquid passing through the first proportional valve 204 and the second proportional valve 205 in accordance with flow rate control data stored in the flow rate control data storage unit 243. An example of a method for controlling the flow rate by the processor 215 will be described below using FIG. 7. FIG. 7 is a diagram schematically illustrating an example of a relationship between a flow rate of a liquid and time according to an embodiment.

FIG. 7 schematically illustrates an example of a relationship between: an instantaneous flow rate of the liquid circulating between the tank 201 and the liquid droplet discharge head 213; and time. As illustrated in FIG. 7, in the liquid circulating between the tank 201 and the liquid droplet discharge head 213, a pulse is generated by liquid supply by the discharge pump 202 and by liquid recovery by the suction pump 203.

Suppose, for example, that in the flow rate control data, a target value MV1 has been set for the third pressure sensor 210, the target value MV1 being that a maximum flow rate "$Q_{max}$" be changed to an average flow rate per time period "$Q_{ave}$". The processor 215, while referring to the measurement results of the third pressure sensor 210, adjusts the flow rate of the liquid passing through the first proportional valve 204 by narrowing the channel cross-sectional area of the first proportional valve 204 so as to approximate the target value MV1. This allows the processor 215 to control the flow rate of the liquid passing through the first proportional valve 204 and the second proportional valve 205. The processor 215 can, by such a control, reduce the pressure of the liquid supplied to the liquid droplet discharge head 213 and suppress pulsation.

The first proportional valve 204 is interposed in the first channel $RT_1$ between the discharge pump 202 and the liquid droplet discharge head 213 and disposed, for example, on the tip side of the arm portion 221 including the liquid droplet discharge head 213 assembled on the robotic portion 220. The second proportional valve 205 is interposed in the second channel $RT_2$ between the suction pump 203 and the liquid droplet discharge head 213 and disposed, for example, on the tip side of the arm portion 221 including the liquid droplet discharge head 213 assembled on the robotic portion 220. The processor 215 also controls the flow rate of the first proportional valve 204 and the second proportional valve 205 in accordance with the flow rate control data. Thus, the circulation device 200 according to the embodiment can suppress the transmission, to the liquid droplet discharge head 213, of the pulsation caused by the discharge pump 202 and the suction pump 203, and can suppress the pulsation by the discharge pump 202 and the suction pump 203.

Figure 8:
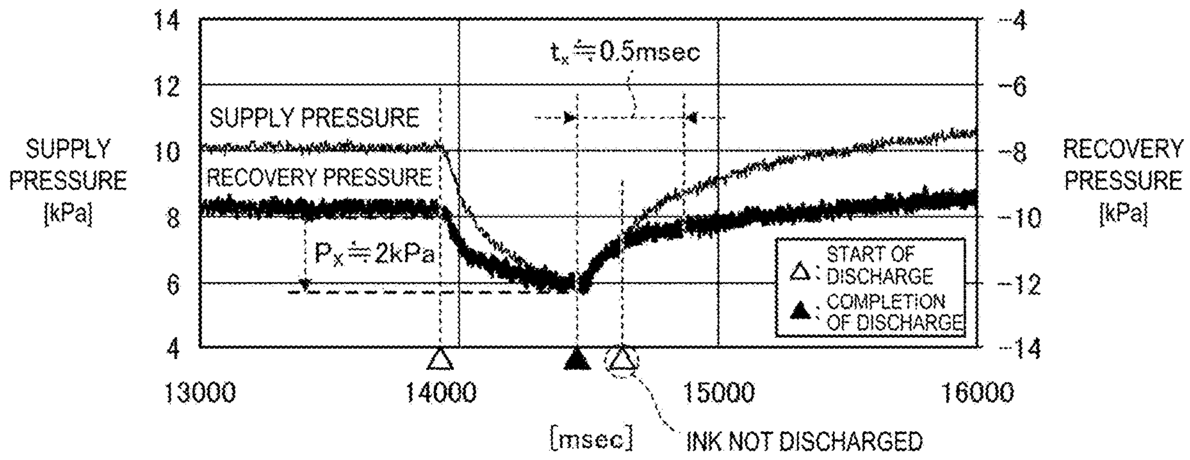
FIG. 8 is a diagram illustrating measurement results of circulation pressure of a liquid during printing according to an embodiment.

In addition, the applicant of the present application has discovered a phenomenon in which, in a printing operation using the above-described circulation device 200, correct printing is not performed due to non-discharge of liquid (ink) or leakage of liquid occurs from the liquid droplet discharge head 213 after solid printing in which liquid is continuously discharged. FIG. 8 is a diagram illustrating measurement results of circulation pressure of a liquid during printing according to an embodiment. The vertical axis on the left side of FIG. 8 indicates the supply pressure, and the vertical axis on the right side of FIG. 8 indicates the recovery pressure. The horizontal axis in FIG. 8 indicates time, and time flows to the right side of FIG. 8. The upper line in the graph region of FIG. 8 indicates a time-series change in the supply pressure, and the lower line in the graph region of FIG. 8 indicates a time-series change in the recovery pressure.

As illustrated in FIG. 8, the supply pressure and the recovery pressure during circulation of the liquid before the liquid is discharged have a substantially constant value. Then, the supply pressure and the recovery pressure of the liquid are reduced together from the start to the completion of continuous liquid discharge that occurs in solid printing. After the completion of the discharge, the supply pressure and the recovery pressure of the liquid begin to increase gradually. The phenomenon of non-discharge of liquid or the like occurs when the discharge of liquid resumes with the supply pressure and the recovery pressure being still not fully recovered.

The applicant of the present application infers a mechanism that causes the phenomenon of non-discharge of liquid as follows. Even after the completion of discharge, the liquid continues to flow from the supply side toward the recovery side, but when the recovery pressure is reduced, the second proportional valve 205 is configured to be closed. The applicant of the present application infers that this causes water-hammering action (water hammer) by the liquid that is not discharged and has lost an outlet, resulting in leakage of the liquid from the nozzle and the non-discharge thereof. Thus, the applicant of the present application solves the above-described problem by causing the processor 215 of the circulation device 200 to execute a control method as described below.

As illustrated in FIG. 8, the applicant of the present application has gained the insight that when a time $t_x$ has elapsed after the completion of liquid discharge, the recovery pressure recovers to a set value in a steady state (e. g., liquid circulation). In the example illustrated in FIG. 8, approximately 0.5 [msec (milliseconds)] after the completion of discharge, the recovery pressure recovers to approximately −10 kPa (kilopascals), which is an initial value at the time of liquid discharge. Thus, the processor 215 is configured to execute control on the basis of this insight. Specifically, after the completion of liquid discharge, the processor 215 performs control to tighten the first proportional valve 204 on the supply side of the liquid, and to tighten the second proportional valve 205 after a predetermined amount of time elapses. Thus, the second proportional valve 205 on the recovery side of the liquid is left open at least until the predetermined amount of time elapses, and the liquid can flow to the recovery side. This can prevent the non-discharge of liquid due to the water-hammering action or the leakage of liquid.

In addition, upon the completion of the discharge of liquid from the liquid droplet discharge head 213, the processor 215 may control the pressure on the recovery side recovering the liquid such that the pressure is lower than the set value in the steady state. Thus, the force pulling the liquid from the recovery side of the liquid can be increased, and the liquid flows efficiently to the recovery side. This can prevent the non-discharge of liquid due to the water-hammering action or the leakage of liquid.

Additionally, upon the completion of the discharge of the liquid from the liquid droplet discharge head 213, the processor 215 may control the pressure on the recovery side recovering the liquid such that the pressure is lower by the amount of the pressure drop due to the discharge of the liquid. In the example illustrated in FIG. 8, the pressure drop on the recovery side is approximately 2 [kPa (kilopascals)], and it is only required that the processor 215 control the pressure on the recovery side recovering the liquid after the completion of the liquid discharge such that the pressure is lower by 2 [kPa (kilopascals)], which is generated by the discharge of the liquid. This can prevent the non-discharge of liquid due to the water-hammering action and the leakage of liquid in the same manner as the control to tighten the second proportional valve 205.

Embodiments have been described in order to fully and clearly disclose the technology according to the appended claims. However, the appended claims are not to be limited to the embodiments described above, and should be configured to embody all modified examples and alternative configurations that a person skilled in the art may make within the fundamental matter set forth in the present description.

Note that the tank 201 may or may not be provided in the base 10, or may be provided at a location other than in the robotic portion 220. Also, the discharge pump 202 and the suction pump 203 may be provided in the base 10.

The invention claimed is:

1. A circulation device for controlling liquid circulation, the circulation device comprising:

a storage unit configured to store a liquid;

a liquid droplet discharge unit configured to discharge the liquid;

a robotic portion mounted with the liquid droplet discharge unit;

a first pressure portion configured to feed the liquid stored in the storage unit to the liquid droplet discharge unit through a first channel;

a second pressure portion configured to feed the liquid recovered in the liquid droplet discharge unit to the storage unit through a second channel;

a first valve portion interposed between the first pressure portion and the liquid droplet discharge unit; and a second valve portion interposed between the second pressure portion and the liquid droplet discharge unit.

2. The circulation device according to claim 1, wherein the robotic portion is assembled on a base, and comprises an arm portion that is freely operable, the first pressure portion is provided on a root side of the arm portion, and the first valve portion and the liquid droplet discharge unit are provided on a tip side of the arm portion.

3. The circulation device according to claim 2, wherein the second pressure portion is provided on a root side of the arm portion, and the second valve portion and the liquid droplet discharge unit are provided on a tip side of the arm portion.

4. The circulation device according to claim 1, wherein the robotic portion is assembled on a base, the robotic portion comprising an arm portion that is freely operable, the second pressure portion is provided on a root side of the arm portion, and the second valve portion and the liquid droplet discharge unit are provided on a tip side of the arm portion.

5. The circulation device according to claim 1, wherein the robotic portion comprises an arm portion that is freely operable, the first pressure portion is provided at an intermediate position of the arm portion, and the first valve portion and the liquid droplet discharge unit are provided on a tip side of the arm portion.

6. The circulation device according to claim 5, wherein the robotic portion comprises an arm portion that is freely operable, the second pressure portion is provided at an intermediate position of the arm portion, and the second valve portion and the liquid droplet discharge unit are provided on a tip side of the arm portion.

7. The circulation device according to claim 1, wherein the robotic portion comprises an arm portion that is freely operable, the second pressure portion is provided at an intermediate position of the arm portion, and the second valve portion and the liquid droplet discharge unit are provided on a tip side of the arm portion.

8. The circulation device according to claim 1, wherein at least one of the first valve portion and the second valve portion is housed inside the liquid droplet discharge unit.

9. The circulation device according to claim 1, further comprising a heater unit configured to heat the liquid stored in the storage unit.

10. The circulation device according to claim 1, comprising a processor configured to tighten the second valve portion after a predetermined amount of time has elapsed following completion of the discharge of the liquid from the liquid droplet discharge unit.

11. The circulation device according to claim 1, comprising a processor configured to make a pressure at the second pressure portion less than a set value in a steady state, upon completion of the discharge of the liquid from the liquid droplet discharge unit.

12. The circulation device according to claim 11, wherein the pressure is less than the set value in the steady state by an amount of a pressure drop caused by the discharge of the liquid.

* * * * *